Sept. 10, 1968 R. M. BUCHWALD 3,400,956
UNIVERSALLY INDEXING LOCK MEANS
Filed Dec. 10, 1965

INVENTOR.
Robert M. Buchwald
BY
Robert J. Outland
ATTORNEY

United States Patent Office 3,400,956
Patented Sept. 10, 1968

3,400,956
UNIVERSALLY INDEXING LOCK MEANS
Robert M. Buchwald, Birmingham, Mich., assignor to General Motors Corporation, Detroit, Mich., a corporation of Delaware
Filed Dec. 10, 1965, Ser. No. 512,937
5 Claims. (Cl. 287—53)

ABSTRACT OF THE DISCLOSURE

The preferred embodiment shows a camshaft universally indexed and lockingly secured to its drive gear by a locking plate non-rotatably retained on the camshaft between the gear and a shoulder of the camshaft. A portion of the circular edge of the locking plae is deformed into a conical recess in the face of the gear by a special bolt received in an opening extending from the recess. The bolt may engage the locking plate at any point on its edge, but once deformed, the plate provides a permanent index for the parts. The indexing may be changed, if desired, by flattening the plate and deforming it at a new location.

---

This invention relates to universally indexing lock means and, more particularly, with respect to the mounting of a gear or sprocket on a shaft such as the camshaft of an internal combusion engine, proposes means permitting indexing of the gear or sprocket to any desired rotational position with respect to the shaft after installation on the shaft with subsequent locking of the gear or sprocket in the selected position to provide a permanently indexed assembly. The invention further contemplates the subsequent re-indexing of the gear or sprocket to a different desired position by means of a relatively simple procedure.

It is often helpful in the assembly of machine components and the like, where a particular indexing of parts in their assembled condition is desired, to provide means by which the proper indexing of the parts may be obtained after their partial assembly. For example, in the assembly of internal combustion engines, particularly of the overhead camshaft type, proper indexing of the camshaft with respect to the crankshaft may be more easily and accurately accomplished if provision is made to assemble, in their proper positions, all elements of the camshaft drive system, whether it be of the gear, chain or toothed belt type, before final indexing (or timing) of the camshaft is completed.

Accordingly, the present invention proposes simple but effective means for indexing relatively rotatable members. The means may be used, for example, to index a camshaft with respect to its drive gear or sprocket after assembly of its drive train. Additionally, the arrangement permits the subsequent change of the timing or indexing of such a camshaft or other member by a simple and inexpensive procedure.

These and other advantages of the invention will be more apparent from the following description and drawings in which.

Figure 1:
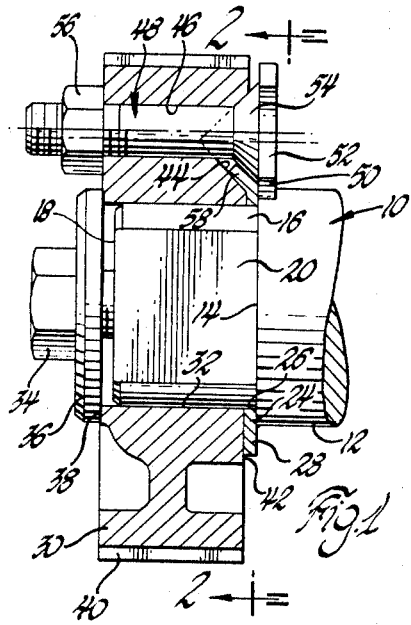
FIGURE 1 is a cross sectional view of a shaft and gear assembly embodying the invention.
Figure 2:
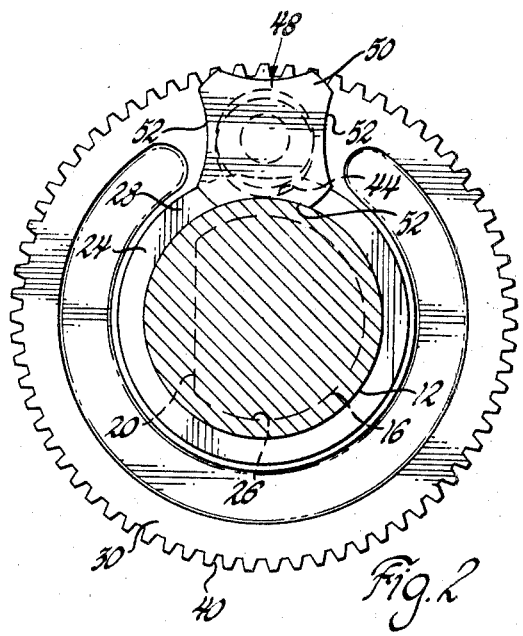
FIGURE 2 is an end elevational view of the assembly of FIGURE 1 partially in cross section and taken generally in plain indicated by the line 2—2 of FIGURE 1.
Figure 3:
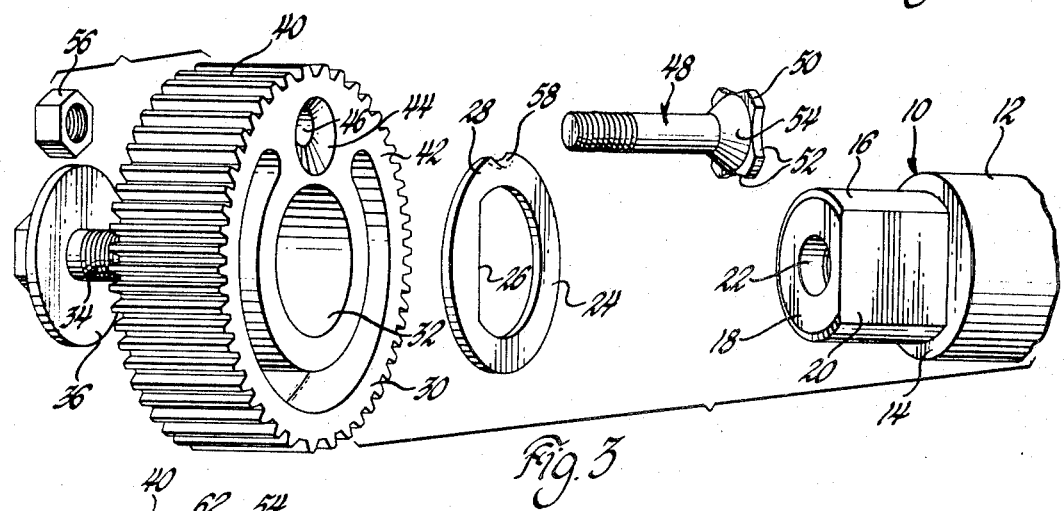
FIGURE 3 is a disassembled pictorial view of the assembly of FIGURES 1 and 2.

Referring now to FIGURES 1 through 3 of the drawing, numeral 10 generally indicates the end portion of a shaft such as the camshaft of an internal combustion engine. Shaft 10 includes a main cylindrical portion 12 which is connected by an annular shoulder 14 with a generally cylindrical pulley receiving portion 16. Portion 16 terminates in an end wall 18 and includes a flat 20 extending the length of portion 16 between the end wall 18 and shoulder 14. A threaded bore 22 is located centrally of end wall 18 and extends axially into the end portion of the shaft. A washer like disc or locking plate 24, having a D-shaped opening 26, fits snugly over receiving portion 16 with one of its faces against shoulder 14 and having the flat portion of opening 26 in engagement with flat 20 of the shaft so that the locking plate is firmly retained in non-rotatable engagement with the shaft 10. Locking plate 24 may be formed of unhardened steel or other suitable material or otherwise constructed such that an annular portion 28 along its outer edge may, for a purpose to be subsequently described, be deformed by bending while the disc is sufficiently stiff to transmit torque between the shaft and the disc through the flat portion of opening 26.

Also received on portion 16 of the shaft, and bearing against a face of plate 24, is a pulley or gear 30 which it is desired to mount in indexed relation to the shaft 10. Pulley 30 includes a central bore 32 which is closely, but freely, received over the cylindrical surface of portion 16 so that the pulley is rotatably moveable with respect to the shaft after installation thereon. The pulley is of sufficient width as to extend slightly beyond the end wall 18 of the shaft and it is retained in a fixed axial position thereon by a bolt 34 secured in threaded bore 22 and holding a retaining washer 36 against a shoulder 38 provided on the outer face of the pulley. The pulley includes teeth 40 around its outer periphery which are adapted to drivingly engage a chain, belt, gear or other driving means.

On its inner surface 42, which bears against plate 24, the pulley 30 is provided with a conical recess or seat 44. A bore 46, having an axis spaced slightly outwardly of the center of the conical recess, extends axially through the pulley and receives the shank portion of a special bolt 48. Bolt 48 has a special head 50 with a plurality of arcuate cutouts 52 around its periphery to register with the cylindrical surface of portion 12 of the shaft. The head also includes a conical surface 54 which engages the outer edge 28 of the locking plate 24 as well as the conical recess 44 of the pulley. A nut 56 secures the bolt 48 tightly in position.

The assembly and operation of the construction so far described is as follows. The locking plate 24, pulley 30, washer 36 and bolt 34 are first assembled to portion 16 of the shaft, bolt 34 being left slightly loose. Bolt 48 is then installed in bore 46 and nut 56 is put on, but is not tightened, so that the outer edge of plate 24 is not yet deformed.

In this condition the pulley 30 is free to rotate on portion 16 of the shaft, although it is held in a relatively fixed axial position thereon. Thus the shaft may be installed in an engine and the belt, chain or gear connections made between the crankshaft and gear 30, subsequent to which the camshaft 10 may be indexed to its proper position with respect to the engine crankshaft.

When the shaft is properly indexed, nut 56 is tightened, drawing the conical portion 54 of bolt 48 against the outer edge 28 of locking plate 24 and deforming a small portion 58 of the plate outer edge by bending it over into the inner edge of recess 44 until the bolt head seats against the other edge of recess 44, firmly securing the locking plate 24 to the pulley 30. Because of the engagement of one of the arcuate cutouts 52 of the bolt head with the surface 12 of the shaft, the tightening of nut 56 may be accomplished merely by the use of a wrench on the nut itself, without the necessity of reaching behind the pulley to prevent rotation of the bolt.

When the nut 56 is completely tightened the locking plate is assembled in permanently indexed relation with pulley 30 and consequently with shaft 10 and it is thus only necessary to fully tighten bolt 34 to complete the final assembly of the shaft arrangement. Should it be subsequently necessary to remove the pulley from the shaft, this may be done by removing bolt 34 without loosening nut 56, so that when the assembly is replaced on the shaft it will be indexed in the same rotational position with respect to the shaft as was fixed in the original assembly operation. Furthermore, even if bolt 48 is removed and plate 24 is disassembled from pulley 30, the parts may again be assembled in the same indexed relation by merely fitting the deformed portion 58 into the conical recess of the pulley before bolt 48 is again installed and nut 56 is tightened.

Should the occasion arise where it is desired to change the relative position of the pulley with respect to the shaft, it is only necessary to disassemble the pulley from the shaft, remove the lock plate from the pulley and reverse its position 180 degrees, so that the deformed portion 58 extends away from the pulley surface 42. When the parts are then reassembled, a new surface of the locking plate 24 will be presented to the conical bolt surface 54 to be deformed into recess 44 as previously described. If desired, the original deformed portion 58 may be flattened before reassembly of the parts.

Figure 4:
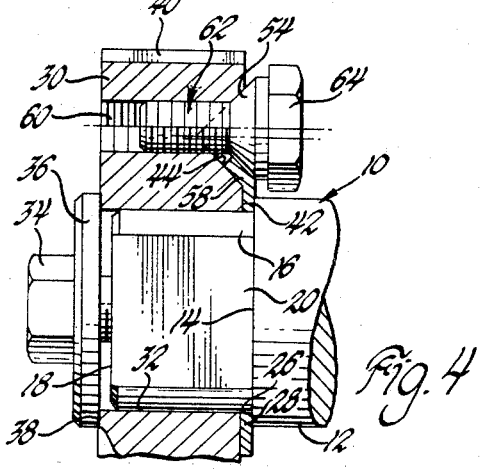
FIGURE 4 is a cross sectional view similar to FIGURE 1 and illustrating an alternative embodiment of the invention.

In FIGURE 4, an embodiment of the invention is illustrated which differs from that of FIGURES 1 through 3 only in the construction of the locking bolt means. Thus similar reference characters are used for the portions of the assembly which are identical to those of FIGURES 1 through 3. Instead of the plain bore 46, FIGURE 4 depicts the use of a threaded bore 60 which receives the threaded shank of a bolt 62 having a standard hexagonal head 64. Bolt 62 includes a conical surface 54 which acts in the same manner as the surface 54 of bolt 48.

The manner of assembling the embodiment of FIGURE 4 differs from that of FIGURES 1 through 3 only in that bolt 62 must be tightened by reaching around to the inner surface of the pulley with a wrench. Except for this difference, the embodiment of FIGURE 4 is used in the same manner and has the same advantages as the embodiment of FIGURES 1 through 3.

While the invention has been presented by reference to only two slightly differing embodiments relating to the installation of a pulley or gear on a shaft, it should be apparent that the invention is broadly applicable to the assembly and indexing of other types of components with respect to one another and it is accordingly intended to cover such changes and modifications as may be made by one skilled in the art within the spirit and scope of the invention as defined by the following claims.

I claim:
1. In combination,
   a support,
   a member rotatably carried on the support and having a recess on one face thereof, said recess comprising a conical seat with a bolt receiving opening extending therefrom into said member,
   a locking plate non-rotatably connected to the support and having a deformable edge portion extending over an edge of said recess and
   a bolt retained in said opening and having a conical surface engaging said plate edge, said bolt deforming a portion of said plate edge into said recess, thereby retaining said plate and said member in permanently indexed assembly and in non-rotatable relation to said support.

2. The combination of claim 1 wherein said locking plate edge portion is circular and concentric with the rotational axis of said member, whereby at assembly said member may be locked to any point on said plate edge portion.

3. In combination,
   a rotatable shaft having a reduced end portion and an annular shoulder connecting the end portion with a larger main portion of the shaft,
   a toothed wheel having a recess in one face thereof, said toothed wheel being rotatably received on said shaft end portion,
   a locking plate non-rotatably retained on said shaft end portion between said shoulder and said one face of the toothed wheel, said locking plate having an annular deformable edge concentric with said shaft end portion and overlapping said recess and
   an axially adjustable retainer means, carried by said toothed wheel and having an end portion overlapping said deformable edge opposite said recess and engageable with said plate at assembly at any desired point of said edge so as to deform any desired portion of said edge into said recess, thereby retaining said plate and said toothed wheel in permanently indexed assembly and in non-rotatable relation with said shaft.

4. The combination of claim 3 wherein said toothed wheel has a bolt receiving opening extending thereinto from said recess, said retainer means comprising a bolt retained in said opening and having a conical surface engaging said plate edge.

5. The combination of claim 4 wherein said bolt receiving opening extends through said toothed wheel, said bolt extending through said bolt receiving opening and being retained therein by a nut threadably engaging the end opposite said conical surface, said bolt having a special head with at least one arcuate recess registering with the outer surface of said shaft main portion to prevent said bolt from turning during tightening of said nut.

References Cited

UNITED STATES PATENTS

| | | | |
|---|---|---|---|
| 822,989 | 6/1906 | Schooley et al. | 151—53 |
| 836,507 | 11/1906 | Keene | 151—53 XR |
| 1,656,697 | 1/1928 | Dickey | 287—53 |
| 1,803,136 | 4/1931 | Schulze | 287—52 |
| 2,269,429 | 1/1942 | Brenkert | 287—53 |
| 2,605,121 | 7/1952 | Ensinger | 287—53 |
| 2,925,292 | 2/1960 | Hirschle | 287—52 |

CARL W. TOMLIN, *Primary Examiner.*

A. KUNDRAT, *Assistant Examiner.*